(12) United States Patent
Zhao

(10) Patent No.: US 12,538,271 B2
(45) Date of Patent: Jan. 27, 2026

(54) METHOD AND APPARATUS FOR DETERMINING RESOURCE, AND STORAGE MEDIUM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 480 days.

(21) Appl. No.: 18/012,909

(22) PCT Filed: Aug. 26, 2020

(86) PCT No.: PCT/CN2020/111512
§ 371 (c)(1),
(2) Date: Dec. 23, 2022

(87) PCT Pub. No.: WO2022/041003
PCT Pub. Date: Mar. 3, 2022

(65) Prior Publication Data
US 2023/0262665 A1     Aug. 17, 2023

(51) Int. Cl.
*H04W 72/02* (2009.01)
*H04L 5/00* (2006.01)
(Continued)

(52) U.S. Cl.
CPC ....... *H04W 72/044* (2013.01); *H04W 72/232* (2023.01); *H04W 72/25* (2023.01); *H04W 72/40* (2023.01); *H04W 72/566* (2023.01)

(58) Field of Classification Search
CPC ..... H04W 72/02; H04W 72/40; H04W 72/25; H04W 76/14; H04W 92/18; H04W 72/23;
(Continued)

(56) References Cited

U.S. PATENT DOCUMENTS 12,101,801 B2 *   9/2024   Zhao ................. H04W 72/56
2015/0365869 A1  12/2015   Gao et al.
(Continued)

FOREIGN PATENT DOCUMENTS

CN     109803321 A     5/2019
CN     110521255 A    11/2019
(Continued)

OTHER PUBLICATIONS

International Search Report issued in Application No. PCT/CN2020/111512, dated May 31, 2021,(4p).
(Continued)

*Primary Examiner* — Sai Aung
(74) *Attorney, Agent, or Firm* — Arch & Lake LLP; Hao Tan; Shen Wang

(57) ABSTRACT

A method for determining resource, an apparatus for determining resource, and a storage medium are provided. The method for determining resource may be applied to a first device, and may include: sending first indication information, wherein the first indication information includes an indication of a time-frequency resource set; sending second indication information, wherein the second indication information includes an indication of a measurement information value corresponding to the time-frequency resource set. The method may be applied to a second device, and may include: receiving first indication information and second indication information sent by a first device, wherein the first indication information includes an indication of a time-frequency resource set, and the second indication information includes an indication of a measurement information value corresponding to the time-frequency resource set; performing resource selection based on the first indication information and the second indication information.

27 Claims, 7 Drawing Sheets

(51) Int. Cl.
*H04W 4/46* (2018.01)
*H04W 72/044* (2023.01)
*H04W 72/232* (2023.01)
*H04W 72/25* (2023.01)
*H04W 72/40* (2023.01)
*H04W 72/566* (2023.01)
*H04W 76/27* (2018.01)

(58) Field of Classification Search
CPC ....... H04W 76/27; H04W 72/20; H04W 4/44; H04W 4/46; H04W 68/005; H04W 88/04; H04W 92/10
See application file for complete search history.

(56) References Cited

U.S. PATENT DOCUMENTS

| | | | |
|---|---|---|---|
| 2019/0222980 A1 | 7/2019 | Lee et al. | |
| 2019/0222981 A1 | 7/2019 | Lee et al. | |
| 2020/0221423 A1* | 7/2020 | Wang | H04W 72/02 |
| 2021/0105055 A1* | 4/2021 | Chae | H04L 5/0091 |
| 2022/0225143 A1* | 7/2022 | Sun | H04W 72/542 |
| 2023/0015263 A1* | 1/2023 | Peng | H04W 72/20 |
| 2023/0047000 A1* | 2/2023 | Guo | H04L 5/0037 |
| 2023/0122730 A1* | 4/2023 | Guo | H04W 72/25 |
| | | | 370/329 |
| 2023/0171796 A1* | 6/2023 | Ji | H04W 72/02 |
| | | | 370/329 |
| 2025/0097958 A1* | 3/2025 | Khoryaev | H04W 72/02 |
| 2025/0141626 A1* | 5/2025 | Li | H04L 5/0064 |

FOREIGN PATENT DOCUMENTS

| | | |
|---|---|---|
| CN | 110876190 A | 3/2020 |
| CN | 110972276 A | 4/2020 |
| CN | 111277356 A | 6/2020 |
| CN | 111294773 A | 6/2020 |
| CN | 111316675 A | 6/2020 |
| CN | 111586722 A | 8/2020 |
| WO | 2019028759 A1 | 2/2019 |

OTHER PUBLICATIONS

Huawei et al., "UL power control for cross-link interference mitigation", 3GPP TSG RAN WG1 Ad Hoc Meeting R1-1800076, Vancouver, Canada, Jan. 26, 2018, (8p).
The First CNOA issued in Chinese Application No. 202080002152.9 dated Nov. 25, 2022, with English translation, (13p).
Li Xing, "Research Technologies and Evalution in 5G Vechicle-to-Everything Resource Allocation", China Master's Theses Full-text Database, Sep. 15, 2019, with English Abstract, (72p).
3GPP tsg_ran\tsg_ran, "RP_2019", Apr. 7, 2020, (130p).
Second Office Action of Chinese Application No. 202080002152.9 dated Apr. 13, 2023, (7p).

* cited by examiner

US 12,538,271 B2

METHOD AND APPARATUS FOR DETERMINING RESOURCE, AND STORAGE MEDIUM

CROSS-REFERENCE

The present application is a U.S. National Stage of International Application No. PCT/CN2020/111512, filed on Aug. 26, 2020, the entire content of which is incorporated herein by reference for all purposes.

TECHNICAL FIELD

The present disclosure relates to a field of communication technology, and more particularly, to a method for determining resource, an apparatus for determining resource and a storage medium.

BACKGROUND

Emergence of new Internet applications has brought high requirements for wireless communication technologies, thus the wireless communication technologies are continuously developed to meet the requirements of applications.

With development of a new generation of 5G mobile communication technology, 5G New Radio (New Radio, NR) technology is used in 3GPP Rel-16 to achieve support for sidelink communication services and scenarios. For example, support for new vehicle wireless communication technology (Vehicle to Everything, V2X) communication services and scenarios.

SUMMARY

To solve problems existing in the related art, the present disclosure provides a method for determining resource, an apparatus for determining resource and a storage medium.

According to a first aspect of the present disclosure, a method for determining resource is provided, the method is applied to a first device, and includes:

sending first indication information, wherein the first indication information includes an indication of a time-frequency resource set; sending second indication information, wherein the second indication information includes an indication of a measurement information value corresponding to the time-frequency resource set.

According to a second aspect of the present disclosure, a method for determining resource is provided, the method is applied to a second device, and includes:

receiving first indication information and second indication information sent by a first device, wherein the first indication information includes an indication of a time-frequency resource set, and the second indication information includes an indication of a measurement information value corresponding to the time-frequency resource set; performing resource selection based on the first indication information and the second indication information.

According to a third aspect of embodiments of the present disclosure, an apparatus for determining resource is provided and includes:

a processor; a memory for storing executable instructions in the processor;

the processor is configured to execute a method for determining resource, wherein the method is applied to a first device, and includes:

sending first indication information, wherein the first indication information includes an indication of a time-frequency resource set; sending second indication information, wherein the second indication information includes an indication of a measurement information value corresponding to the time-frequency resource set.

According to a fourth aspect of embodiments of the present disclosure, an apparatus for determining resource is provided and includes:

a processor; a memory for storing executable instructions in the processor;

the processor is configured to execute a method for determining resource, wherein the method is applied to a second device, and includes:

receiving first indication information and second indication information sent by a first device, wherein the first indication information includes an indication of a time-frequency resource set, and the second indication information includes an indication of a measurement information value corresponding to the time-frequency resource set; performing resource selection based on the first indication information and the second indication information.

It should be understood that the foregoing general descriptions and the following detailed descriptions are exemplary and explanatory only, and are not intended to limit the disclosure.

BRIEF DESCRIPTION OF THE DRAWINGS

The accompanying drawings, which are incorporated in and constitute a part of the description, illustrate embodiments consistent with the disclosure and, together with the description, serve to explain the principle of the present disclosure.

DETAILED DESCRIPTION

Embodiments will be described in detail here, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the present disclosure. Instead, they are merely examples of apparatuses and methods consistent with aspects related to the present disclosure as recited in the appended claims.

In the related art, a user device A of the sidelink communication may send a resource set to a user device B with a resource selection mode Mode2, and the user device B considers it when performing resource selection for its own data transmission. Resource coordination is required between user devices. However, in the related art, there is no resource coordination solution in the related art.

Figure 1:
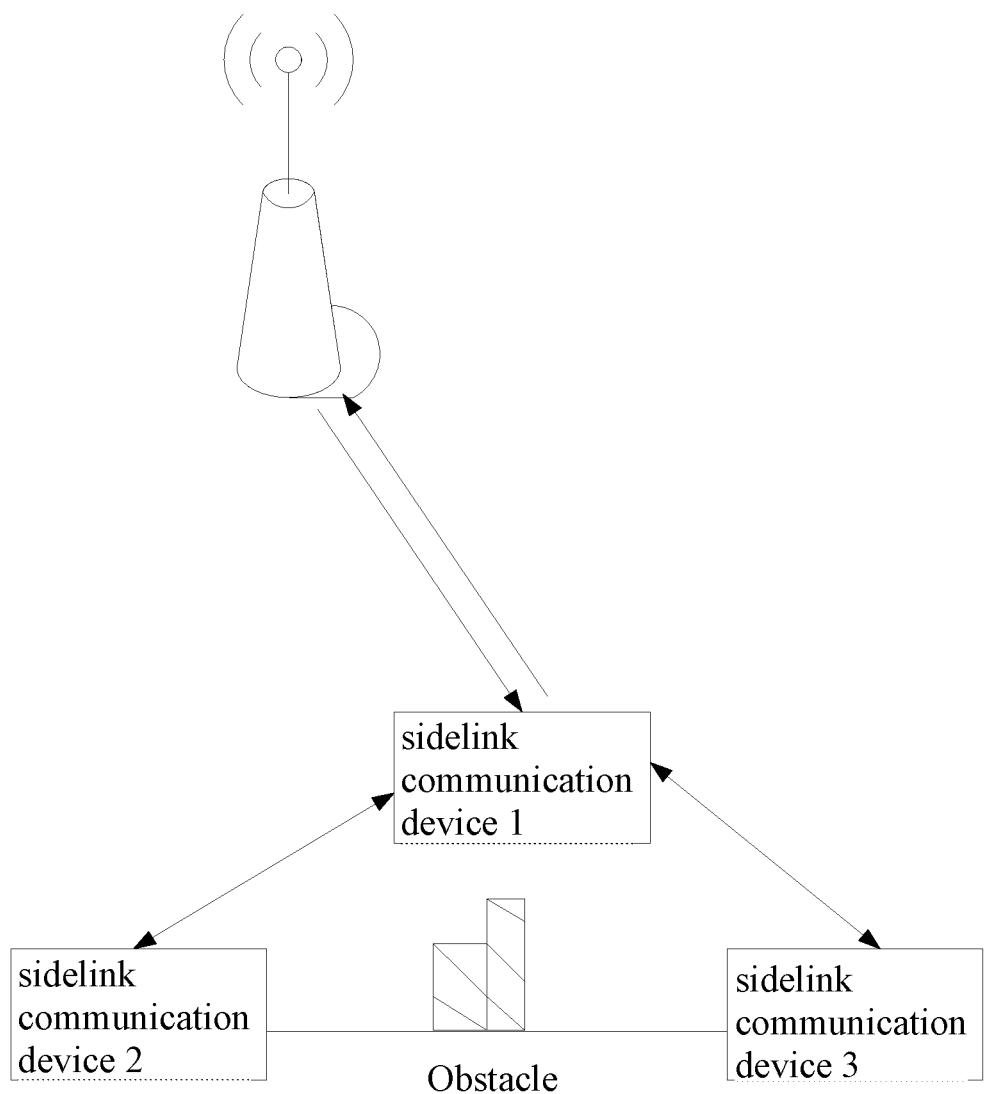
FIG. 1 is a diagram illustrating a sidelink communication architecture according to an embodiment.

A sidelink communication method provided by examples of the present disclosure may be applied to a sidelink communication system illustrated in FIG. 1. Referring to FIG. 1, in a scenario where sidelink communication is performed between sidelink communication devices, a network device configures a sidelink communication device 1 with various transmission parameters for data transmission. A sidelink communication device 1, a sidelink communication device 2 and a sidelink communication device 3 perform the sidelink communication. An obstacle may exist between the sidelink communication device 2 and the sidelink communication device 3. A communication link between the network device and the sidelink communication device is an uplink or a downlink, and a link between the sidelink communication devices is a sidelink.

In the present disclosure, a communication scenario of the direct communication between the sidelink communication devices may be Vehicle to Everything (V2X) scenario, where V represents a vehicle-mounted device, and X represents any object that interacts with the vehicle-mounted device. At present, X mainly includes vehicle-mounted devices, handheld devices, traffic roadside infrastructure and networks. A V2X interaction information mode includes: Vehicle to Vehicle (V2V) interaction, Vehicle to Infrastructure (V2I) interaction, Vehicle to Pedestrian (V2P) interaction, Vehicle to Network (V2N) interaction.

Internet of Vehicles may effectively improve traffic safety, improve traffic efficiency and enrich people's travel experience. Using existing cellular communication technologies to support the Internet of Vehicles communication may effectively utilize the existing base station deployments, reduce overhead for devices, and also be more conducive to providing QoS guaranteed service to meet requirement of the Internet of Vehicles business. Thus, in Long Term Evolution (LTE) Rel-14/15, support of the cellular network for the V2x communication of the Internet of Vehicles is provided, that is, a cellular vehicle wireless communication technology (Cellular-Vehicle to Everything, C-V2X). In C-V2x, the communication between the vehicle device and other devices may be transferred through a base station and a core network, that is, communication is performed by using an uplink and downlink between a terminal device and a base station in an original cellular network to communicate. The communication may also be performed by directly using a sidelink between devices. Compared to Uu interface communication, the sidelink communication features short delay and low overhead and the like, and thus is very suitable for sidelink communications between a vehicle-mounted device and another peripheral device geographically located nearby.

With development of a new generation of 5G mobile communication technology, 5G NR technology is utilized in 3GPP Rel-16 so as to achieve support new V2x communication services and scenarios, such as Vehicles Platooning, Extended Sensors, Advanced Driving, and Remote Driving, and the like. In general, 5G V2x sidelink may provide higher communication rate, shorter communication delay and more reliable communication quality.

A communication scenario of the direct communication between the sidelink communication devices may also be a Device to Device (D2D) communication scenario. The sidelink communication devices that perform the direct communication in the examples of the present disclosure may include various handheld devices with a wireless communication function, vehicle-mounted devices, wearable devices, computing devices or other processing devices connected to a wireless modem, and various forms of user devices (User equipment UE), mobile stations (MS), terminals, terminal devices (Terminal Equipment), etc. For ease of description, the examples of the present disclosure are described below by taking a sidelink communication device as the user device as an example.

In R17 Sidelink Enhancement approved by 3GPP, one sidelink communication device (such as a user device 2) of the sidelink communication devices for the sidelink communication may send a resource set to other user device (such as a user device 3) with a resource selection mode Mode2, and the other user device (such as the user device 3) with the resource selection mode Mode2 considers it when performing resource selection for its own data transmission.

However, how the user device uses the resource set indicated by other user device to perform its own resource selection is still under study.

Embodiments of the present disclosure provide a method for determining resource, a user device sending a resource set to other user device may send a measurement information value corresponding to the resource set to the other user device, such that the other device may perform resource selection in a received resource set based on the measurement information value.

For the convenience of description, the embodiments of the present disclosure refer to a user device that send the resource set as a first device, and refer to a user device that receives the resource set and performs the resource selection as a second device.

Figure 2:
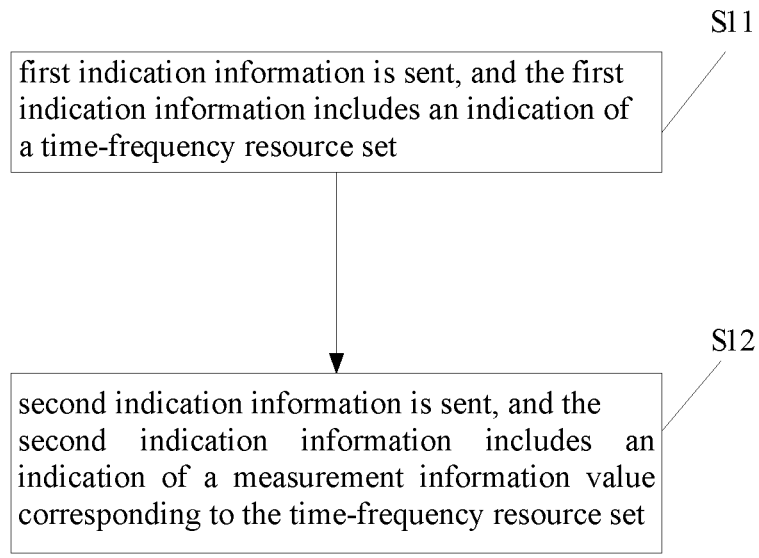
FIG. 2 is a flowchart of a method for determining resource illustrated according to an embodiment.

FIG. 2 is a flowchart of a method for determining resource illustrated according to an embodiment. As illustrated in FIG. 2, the method for determining resource is applied in the first device, the first device may be a terminal for sidelink communication, including the following steps S11 and S12.

In step S11, sending first indication information to a second device, wherein the first indication information includes an indication of a time-frequency resource set.

In step S12, sending second indication information to the second device, wherein the second indication information includes an indication of a measurement information value corresponding to the time-frequency resource set.

In the embodiment of the present disclosure, the resource set sent by the first device may be a time-frequency resource set, the time-frequency resource set may include a time resource, a frequency resource, and/or a time-frequency resource.

In the embodiment of the present disclosure, the time-frequency resource set may be indicated by indication information. For the convenience of description, the information containing the indication of the time-frequency resource set is referred as the first indication information.

In the embodiment of the present disclosure, the measurement information value corresponding to the time-frequency resource sent by the first device is configured, and the measurement information value is indicated to other device through the indication information, such that the other device may perform the resource selection in the time-frequency resource set based on the measurement information value.

In the embodiment of the present disclosure, the indication information indicating the measurement information value corresponding to the time-frequency resource set sent by the first device is referred as the second indication information, and the second indication information includes the indication of the measurement information value corresponding to the time-frequency resource set.

In an embodiment, the measurement information value involved in the embodiment of the present disclosure may be, on the one hand, a reference signal received power (RSRP) value, may also be referred as a sidelink reference signal received power (S-RSRP) value. On the other hand, the measurement information value involved in the embodiments of the present disclosure may be a RSRP offset value or may also be referred as a S-RSRP offset value.

The measurement information values involved below in the embodiments of the present disclosure may be either RSRP (S-RSRP) value or RSRP (S-RSRP) offset value unless otherwise specified.

In the embodiment of the present disclosure, the measurement information value may be determined based on a specified measurement information value set, that is, the measurement information value belongs to the specified measurement information value set.

The specified measurement information value set may be determined based on downlink control information or through pre-configuration information.

In an embodiment, the first device receives downlink control information sent by a network device, and acquires the specified measurement information value set through an indication in the received downlink control information. In some embodiments, the first device acquires the specified measurement information value set according to the pre-configuration information. For example, the embodiments of the present disclosure configure a group of possible S-RSRP offset values for the user device through pre-configuration or base station configuration.

In the embodiment of the present disclosure, when the first device performs a measurement information value indication involved in the measurement information value set, the indication may be performed by an identifier corresponding to the measurement information value. In one example, the first device informs other device of a specific offset value in the measurement information value set by indicating a serial number. For example, a group of 8 S-RSRP offset values {−12, −9, −6, −3, 3, 6, 9, 12} dB is configured, and the specific S-RSRP offset value may be indicated by using 3 bit.

The measurement information value set involved in the embodiments of the present disclosure may be configured based on a sidelink resource pool or a sidelink bandwidth part.

In an embodiment, the measurement information value is determined based on a reference signal information measurement value. The reference signal information measurement value is obtained based on a measurement of reference signal information for a monitored sidelink control signaling or a sidelink transmission corresponding to the monitored sidelink control signaling, and the sidelink control signaling indicates a reserved resource overlapping with the time-frequency resource set. It may be understood that the overlap of the time-frequency resource set and the reserved resource in the embodiments of the present disclosure may be understood as the overlap of some resource or the overlap of all resources.

In an embodiment, the measurement information value is determined based on a specified measurement threshold value.

The specified measurement threshold value may be determined based on downlink control information or configured through pre-configuration information.

The first device receives the downlink control information sent by a network device, and acquires the specified measurement threshold value through an indication in the downlink control information. In some embodiments, the first device acquires the specified measurement threshold value according to the pre-configuration information.

In one example, the user device A monitors that the downlink control information sent by other user device has occupied a time-frequency resource in the resource set, and performs S-RSRP measurement on the downlink control information or sidelink communication associated downlink control information. The S-RSRP measurement result is compared with the specified measurement threshold value to determine the S-RSRP offset value. The specified measurement threshold value may be obtained through base station configuration or pre-configuration.

Further, the embodiments of the present disclosure may send the first indication information and/or the second indication information based on a sidelink control signaling. That is, in the embodiment of the present disclosure, the sidelink control signaling sent by the first device includes the first indication information and/or the second indication information.

In an example, the user device A may send a sidelink control signaling (such as downlink control information) to the user device B, and an indication of S-RSRP offset value is included the sidelink control signaling (such as downlink control information). The user device B receives the sidelink control signaling and acquires the indication of the S-RSRP offset value.

In the embodiment of the disclosure, the sidelink control signaling is divided into two parts, namely a first part and a second part. The first part of the sidelink control signaling and the second part of the sidelink control signaling are respectively channel coded and transmitted on different physical layer channels. In the embodiment of the present disclosure, the measurement information value may be indicated by a first part of the downlink control information or by a second part of the downlink control information. It may also be understood that the first indication information may be indicated by the first part of the sidelink control signaling, or by the second part of the sidelink control signaling. Further, the second indication information may be indicated by the first part of the sidelink control signaling, or by the second part of the sidelink control signaling. That is, the first part of the sidelink control signaling includes the first indication information and/or the second indication information, or the second part of the sidelink control signaling includes the first indication information and/or the second indication information, or the first part of the sidelink control signaling and the second part of the sidelink control information include the first indication information and/or the second indication information.

In the embodiment of the present disclosure, the measurement information value and the associated time-frequency resource set may be sent in a same downlink control information, that is, the sent sidelink control signaling includes the first indication information and the second indication information. In some embodiments, the measurement information value may be sent in a same time unit with the associated time-frequency resource set, indicating that they are related to each other. That is, the sidelink control signaling sent in the same time unit includes the first indication information and the second indication information.

In an embodiment, the measurement information value may also be configured using a dedicated signaling of the user device, and the consistency of configuration between user devices should be ensured by a base station side.

Further, in the embodiment of the present disclosure, the first device may also send priority information corresponding to the time-frequency resource set. In an example, the priority information corresponding to the time-frequency resource set is indicated by the second indication information, and that is, the second indication information includes the priority information corresponding to the time-frequency resource set.

In the embodiment of the present disclosure, the first device sends the first indication information and the second indication information, and the second device that receives the first indication information and the second indication information may perform resource selection based on the first indication information and the second indication information.

Figure 3:
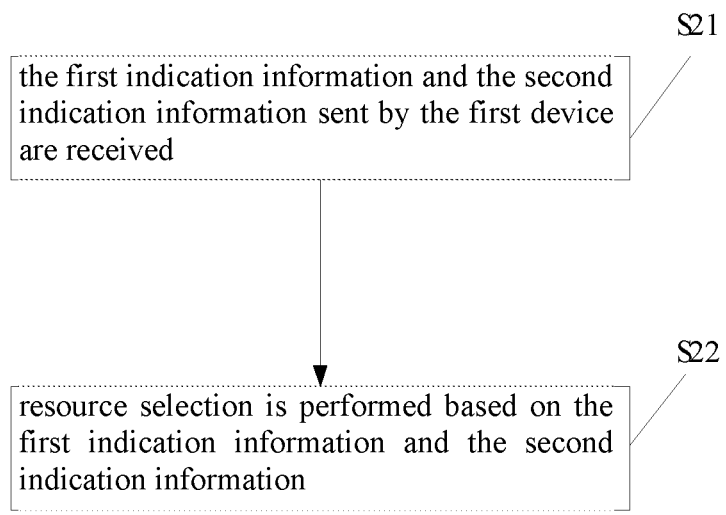
FIG. 3 is a flowchart of a method for determining resource illustrated according to an embodiment.

FIG. 3 is a flowchart of a method for determining resource illustrated according to an embodiment. The method for determining resource illustrated in FIG. 3 is applied to a second device, and the second device may be a terminal for sidelink communication, for example, a user device with a resource selection mode Mode2. As illustrated in FIG. 3, the method for determining resource includes the following steps S21 and S22.

In step S21, receiving the first indication information and the second indication information sent by the first device.

The first indication information includes an indication of a time-frequency resource set, and the second indication information includes an indication of a measurement information value corresponding to the time-frequency resource set.

In step S22, performing resource selection based on the first indication information and the second indication information.

In the embodiment of the present disclosure, one way for the second device to perform the resource selection based on the first indication information and the second indication information may be to use a resource set and a corresponding measurement information value to exclude resource, for example, to exclude a resource set indicated by the first indication information from a candidate resource set based on the measurement information value indicated by the second indication information.

In the related art, the user device monitors the downlink control information sent by other user device, and simultaneously performs S-RSRP measurement on the monitored downlink control information or the sidelink transmission corresponding to the monitored downlink control information. A S-RSRP threshold value is determined according to the priority information indicated in the monitored downlink control information and the priority of the data to be sent by the user device. If the S-RSRP measurement result exceeds the S-RSRP threshold value, a reserved resource indicated by the downlink control information are excluded from the candidate resource set.

The candidate resource set may be determined based on a resource selection window defined when the user device performs the resource selection.

In the embodiment of the present disclosure, the second device may receive the priority information sent by the first device, and exclude the resource set indicated by the first indication information from the candidate resource set based on the priority information.

Figure 4:
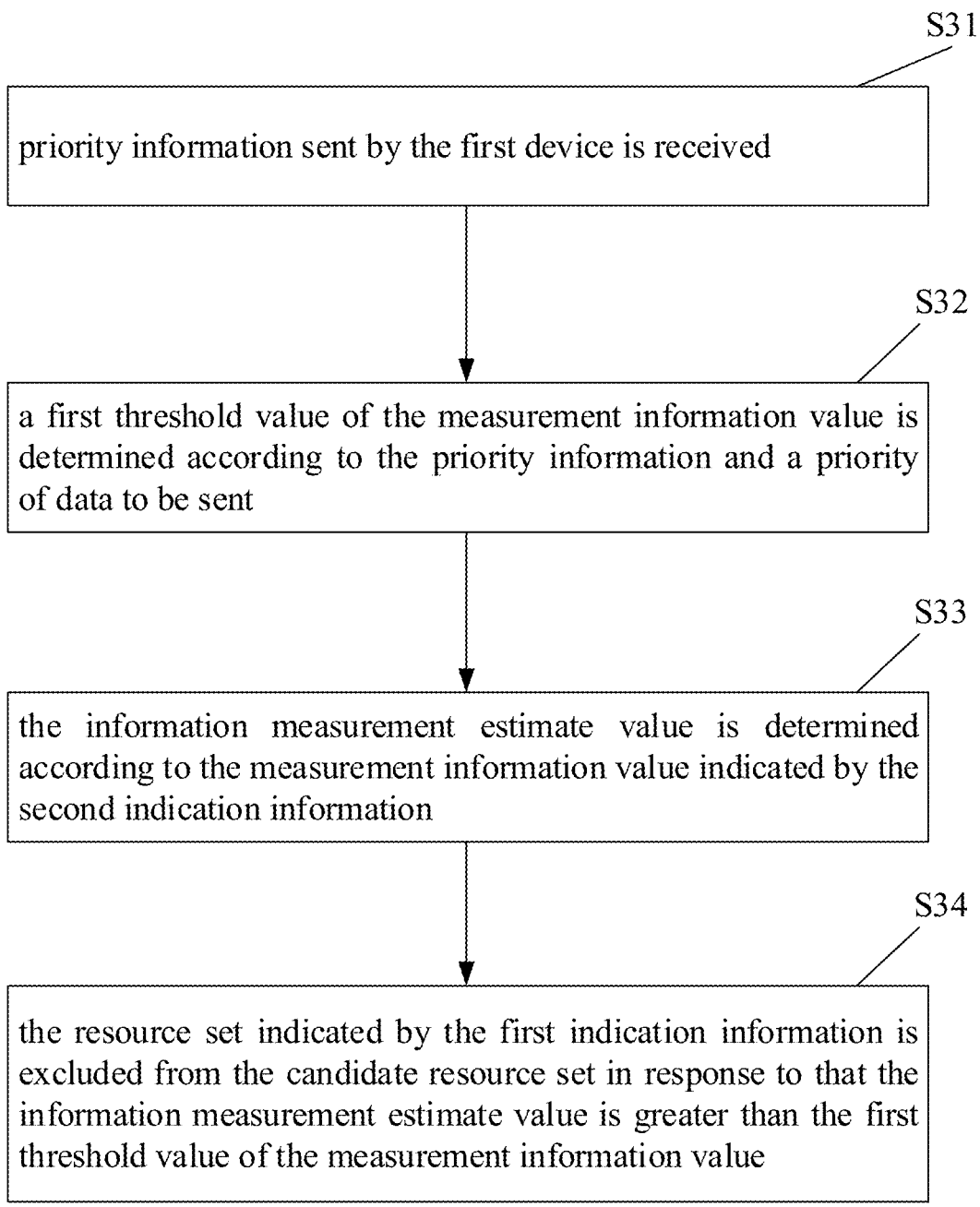
FIG. 4 is a flowchart of a method for determining resource illustrated according to an embodiment.

FIG. 4 is a flowchart of a method for determining resource illustrated according to an embodiment. As illustrated in FIG. 4, the second device may include the following steps S31 to S34 when determining resource.

In step S31, receiving priority information sent by the first device.

In step S32, determining a first threshold value of the measurement information value according to the priority information and a priority of data to be sent.

The first threshold value of the measurement information value may be determined based on the downlink control information.

The second device receives the downlink control information sent by the network device, and determines the first threshold value of the measurement information value according to the indication contained in the received downlink control information.

There is a correspondence between the first threshold value of the measurement information value, the priority sent by the first device and the priority of data to be sent. In an example, when the priority sent by the first device is i1 and the priority of the data to be sent is i2, the first threshold value of the measurement information value is Threshold_i. When the priority sent by the first device is j1 and the priority of the data to be sent is j2, the first threshold value of the measurement information value is Threshold_j. This correspondence may be pre configured, determined according to a protocol, or indicated by a dedicated signaling.

In step S33, determining an information measurement estimate value according to the measurement information value indicated by the second indication information.

In step S34, excluding the resource set indicated by the first indication information from the candidate resource set in response to that the information measurement estimate value is greater than the first threshold value of the measurement information value.

In an example, a user device B receives the resource set sent by user device A, a corresponding S-RSRP offset value and priority information. The user device B determines a S-RSRP threshold value based on the priority information and the priority of data to be sent by the user device, and estimates the S-RSRP estimate value based on the S-RSRP offset value. If the S-RSRP estimate value exceeds the S-RSRP threshold value, a time-frequency resource in the resource set is excluded from the candidate resource set.

Figure 5:
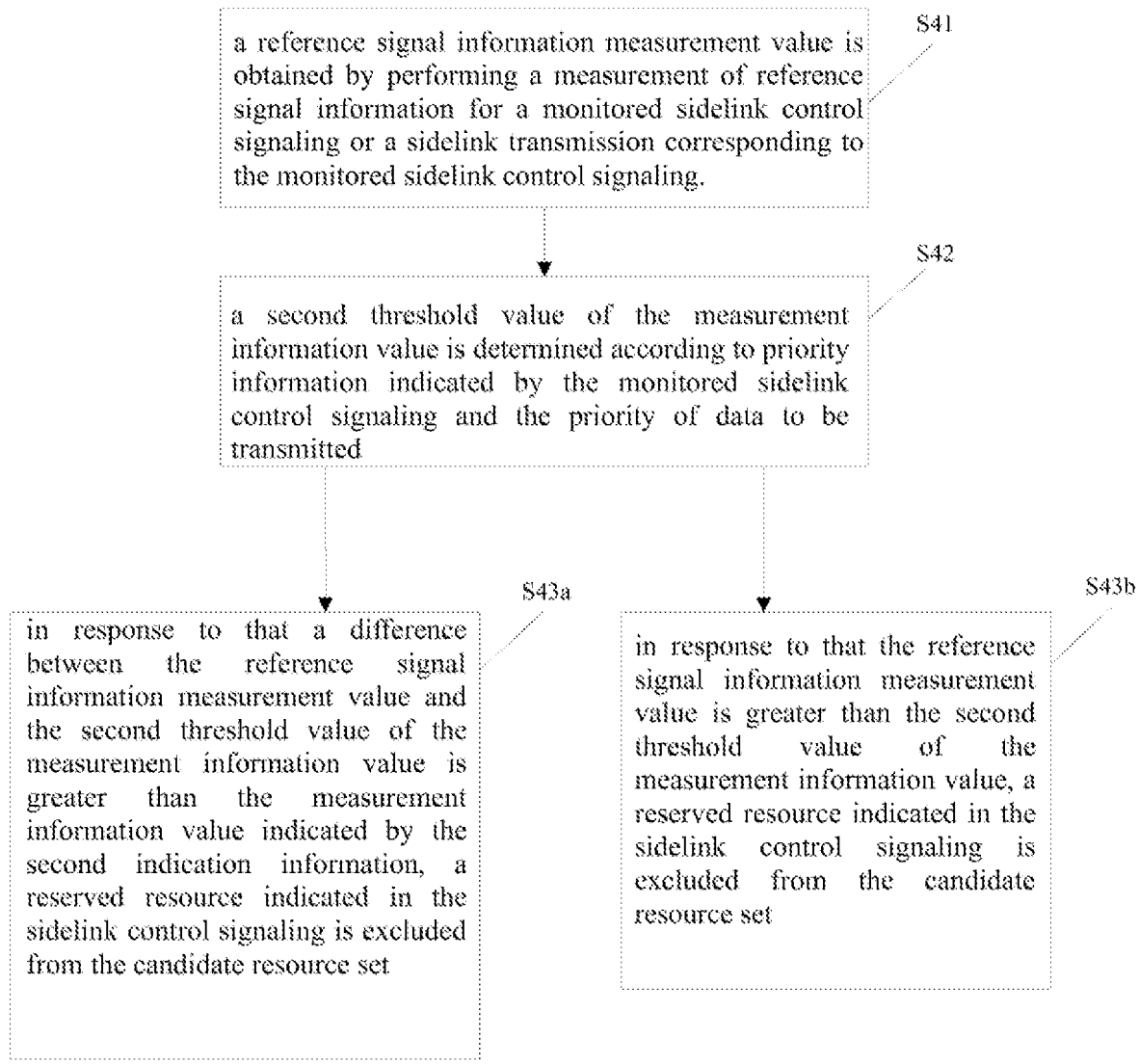
FIG. 5 is a flowchart of a method for determining resource illustrated according to an exemplary embodiment.

FIG. 5 is a flowchart of a method for determining resource illustrated according to an embodiment. As illustrated in FIG. 5, the second device may include the following steps S41, S42 and S43a or S43b when determining resource.

In step S41, obtaining a reference signal information measurement value by performing a measurement of reference signal information for a monitored sidelink control signaling or a sidelink transmission corresponding to the monitored sidelink control signaling.

In step S42, determining a second threshold value of the measurement information value according to priority information indicated by the monitored sidelink control signaling and the priority of data to be transmitted.

There is a correspondence between the second threshold value of the measurement information value, the priority indicated by the monitored sidelink control signaling and the priority of the data to be sent. In an example, when the priority indicated by the monitored sidelink control signaling is m1 and the priority of the data to be sent is m2, the first threshold value of the measurement information value is Threshold m. When the priority indicated by the monitored sidelink control signaling is n1 and the priority of the data to be sent is n2, the first threshold value of the measurement information value is Threshold_n. This correspondence may be pre configured, determined according to a protocol, or indicated by a dedicated signaling.

In step S43a, in response to that a difference between the reference signal information measurement value and the second threshold value of the measurement information value is greater than the measurement information value indicated by the second indication information, excluding a reserved resource indicated in the sidelink control signaling from the candidate resource set.

In an example, in the embodiment of the present disclosure, when it is determined that the reserved resource indicated in the sidelink control signaling overlaps with a resource in the time-frequency resource set indicated by the first indication information, it may be determined whether the difference between the reference signal information measurement value and the second threshold value of the measurement information value is greater than the measurement information value indicated by the second indication information. If so, the reserved resource is excluded from the candidate resource set. In other words, in the embodiment of the present disclosure, when it is determined that the reserved resources indicated in the sidelink control signaling overlaps with the resource in the time-frequency resource set indicated by the first indication information, the reserved resource indicated in the sidelink control signaling may be excluded from the candidate resource set based on the difference between the reference signal information measurement value and the second threshold value of the measurement information value being greater than the measurement information value indicated by the second indication information.

In step S43b, in response to that the reference signal information measurement value is greater than the second threshold value of the measurement information value, excluding a reserved resource indicated in the sidelink control signaling from the candidate resource set.

In an example, a user device B receives a resource set and a corresponding S-RSRP offset value sent by a user device A. The user device monitors SCI sent by other user device, performs S-RSRP measurement on a monitored SCI or a corresponding sidelink transmission, and determines a S-RSRP threshold value according to priority information indicated in the monitored SCI and priority of data to be sent by the user device. When the time-frequency resource reserved by the SCI overlaps with the resource in the resource set, if the difference between a S-RSRP measurement result and the S-RSRP threshold value exceeds the S-RSRP offset value, a reserved resource indicated by SCI is excluded from the candidate resource set; otherwise, if the S-RSRP measurement result exceeds the S-RSRP threshold value, the reserved resource indicated by SCI is excluded from the candidate resource set.

It may be understood that the measurement information value involved in the resource selection performed by the second device in the embodiments of the present disclosure may be the measurement information value involved in a process of determining resource performed by the first device. For example, the measurement information value includes a reference signal received power value or a reference signal received power offset value. The measurement information value belongs to a specified measurement information value set.

In an embodiment, the specified measurement information value set is determined based on the downlink control information sent by the network device, or based on the pre-configuration information.

In an embodiment, the measurement information value set is configured based on a sidelink resource pool or a sidelink communication bandwidth part.

In an embodiment, the measurement information value is determined based on a specified measurement threshold value.

It may be understood that the specified measurement threshold value used to determine the measurement information value in the embodiments of the present disclosure and a threshold value used by the second device to exclude the resource based on its own measurement result may be the same or different.

Further, in an embodiment of the embodiment of the present disclosure, the first indication information and/or the second indication information may be received based on the sidelink control signaling. That is, the received sidelink control signaling includes the first indication information and/or the second indication information.

In an embodiment, in another embodiment of the embodiment of the present disclosure, the sidelink control signaling received in a same time unit includes the first indication information and the second indication information.

In an embodiment, the second indication information includes priority information corresponding to the time-frequency resource set.

In the embodiment of the present disclosure, the second device may acquire the time-frequency resource set sent by the first device and the measurement information value corresponding to the time-frequency resource set based on the first indication information and the second indication information sent by the first device, and perform resource selection based on the measurement information value and the time-frequency resource set, for example, exclude the time-frequency resource set indicated by the first indication information from the candidate resource set, thereby achieving that the second device performs the resource selection based on the time-frequency resource indicated by the first device.

Based on the same concept, the embodiments of the present disclosure also provides an apparatus for determining resource.

It may be understood that the apparatus for determining resource provided by the embodiments of the present disclosure includes corresponding hardware structures and/or software modules for performing various functions in order to implement the above functions. The embodiments of the present disclosure can be implemented in hardware or a combination of hardware and computer software, with the elements and algorithm steps of the examples described in connection with the embodiments disclosed in the present disclosure. Whether a function is performed in hardware or computer software-driven hardware depends on the particular application and design constraints of the solution. Those skilled in the art may use different methods to implement the described functions for each particular application, but such implementation should not be considered to be beyond the scope of the technical solutions of the embodiments of the present disclosure.

Figure 6:
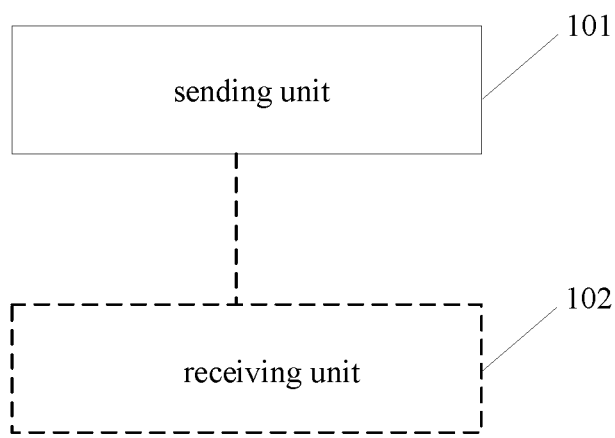
FIG. 6 is a block diagram of an apparatus for determining resource illustrated according to an embodiment.

FIG. 6 is a block diagram of an apparatus for determining resource illustrated according to an embodiment. Referring to FIG. 6, the apparatus 100 for determining resource is applied to a first device, including a sending unit 101.

The sending unit 101 is configured to send first indication information, the first indication information includes an indication of a time-frequency resource set, and configured to send second indication information, the second indication information includes an indication of a measurement information value corresponding to the time-frequency resource set.

In an embodiment, the measurement information value includes a reference signal received power value or a reference signal received power offset value.

In an embodiment, the measurement information value belongs to a specified measurement information value set.

In an embodiment, the apparatus 100 for determining resource further includes a receiving unit 102, and the receiving unit 102 is configured to:

receive downlink control information sent by a network device, and acquire the specified measurement information value set through an indication in the downlink control information; or acquire the specified measurement information value set according to pre-configuration information.

In an embodiment, the measurement information value set is configured based on a sidelink resource pool or a sidelink communication bandwidth part.

In an embodiment, the measurement information value is determined based on a reference signal information measurement value. The reference signal information measurement value is obtained based on a measurement of reference signal information for a monitored sidelink control signaling or a sidelink transmission corresponding to the monitored sidelink control signaling, and the sidelink control signaling indicates a reserved resource overlapping with the time-frequency resource set.

In an embodiment, the measurement information value is determined based on a specified measurement threshold value.

In an embodiment, the apparatus 100 for determining resource further includes a receiving unit 102, and the receiving unit is configured to:

receive downlink control information sent by a network device, and acquire the specified measurement threshold value through an indication in the downlink control information;

or acquire the specified measurement threshold value according to pre-configuration information.

In an embodiment, the first indication information and/or the second indication information is included in a sent sidelink control signaling.

In an embodiment, the sidelink control signaling includes a first part of the sidelink control signaling and a second part of the sidelink control signaling; the first part of the sidelink control signaling includes the first indication information and/or the second indication information, and/or the second part of the sidelink control signaling comprises the first indication information and/or the second indication information.

In an embodiment, the first indication information and the second indication information are included in the sidelink control signaling sent in a same time unit.

In an embodiment, the second indication information includes priority information corresponding to the time-frequency resource set.

Figure 7:
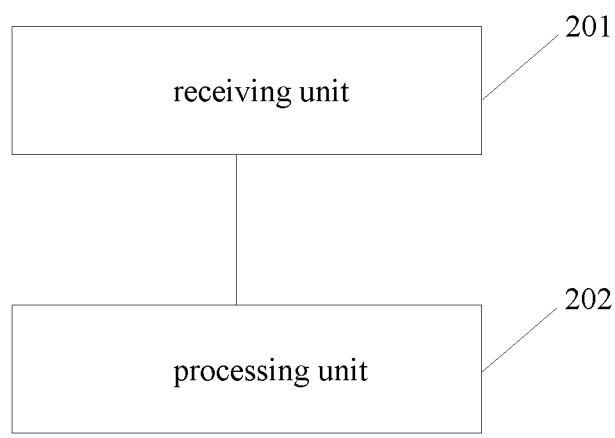
FIG. 7 is a block diagram of an apparatus for determining resource illustrated according to an embodiment.

FIG. 7 is a block diagram of an apparatus for determining resource illustrated according to an embodiment. Referring to FIG. 7, the apparatus for determining resource 200 is applied to a second device, includes a receiving unit 201 and a processing unit 202.

The receiving unit 201 is configured to receive first indication information and second indication information sent by a first device, the first indication information includes an indication of a time-frequency resource set, and the second indication information includes an indication of a measurement information value corresponding to the time-frequency resource set. The processing unit 202 is configured to perform resource selection based on the first indication information and the second indication information.

In an embodiment, the processing unit 202 is configured to exclude a resource set indicated by the first indication information from a candidate resource set based on a measurement information value indicated by the second indication information.

In an embodiment, the receiving unit 201 is further configured to receive priority information sent by the first device.

The processing unit 202 is configured to exclude the resource set indicated by the first indication information from the candidate resource set based on the measurement information value indicated by the second indication information in the following manner:

determining a first threshold value of the measurement information value according to the priority information and a priority of data to be sent; determining an information measurement estimate value according to the measurement information value indicated by the second indication information; excluding, in response to that the information measurement estimate value is greater than the first threshold value of the measurement information value, the resource set indicated by the first indication information from the candidate resource set.

In an embodiment, the receiving unit 201 is further configured to receive the downlink control information sent by the network device, and determine the first threshold value of the measurement information value according to the indication contained in the downlink control information.

In an embodiment, the processing unit 202 is further configured to obtain a reference signal information measurement value by performing a measurement of reference signal information for a monitored sidelink control signaling or a sidelink transmission corresponding to the monitored sidelink control signaling, and determine a second threshold value of a measurement information value according to priority information indicated by the monitored sidelink control signaling and a priority of data to be sent.

The processing unit 202 is configured to perform the resource selection based on the first indication information and the second indication information in the following manner:

Excluding, in response to that a difference between the reference signal information measurement value and the second threshold value of the measurement information value is greater than a measurement information value indicated by the second indication information, a reserved resource indicated in the sidelink control signaling from a candidate resource set; or excluding, in response to that the reference signal information measurement value is greater than the second threshold value of the measurement information value, a reserved resource indicated in the sidelink control signaling from a candidate resource set.

In an embodiment, in response to that a difference between the reference signal information measurement value and the second threshold value of the measurement information value is greater than the measurement information value indicated by the second indication information, and the reserved resource indicated in the sidelink control signaling overlaps with a resource in the time-frequency resource set, the processing unit 202 is further configured to exclude the reserved resource indicated in the sidelink control signaling from the candidate resource set.

In an embodiment, the measurement information value belongs to a specified measurement information value set.

In an embodiment, the receiving unit 201 is further configured to: receive downlink control information sent by a network device, and acquire the specified measurement information value set through an indication in the downlink control information; or acquire the specified measurement information value set according to pre-configuration information.

In an embodiment, the measurement information value set is configured based on a sidelink resource pool or a sidelink communication bandwidth part.

In an embodiment, the first indication information and/or the second indication information is included in a received sidelink control signaling.

In an embodiment, the first indication information and the second indication information are included in the sidelink control signaling received in a same time unit.

In an embodiment, the second indication information includes priority information corresponding to the time-frequency resource set.

Regarding the apparatus in the above embodiments, the specific manner in which each module performs operations has been described in detail in the embodiments of the method, and will not be described in detail here.

Figure 8:
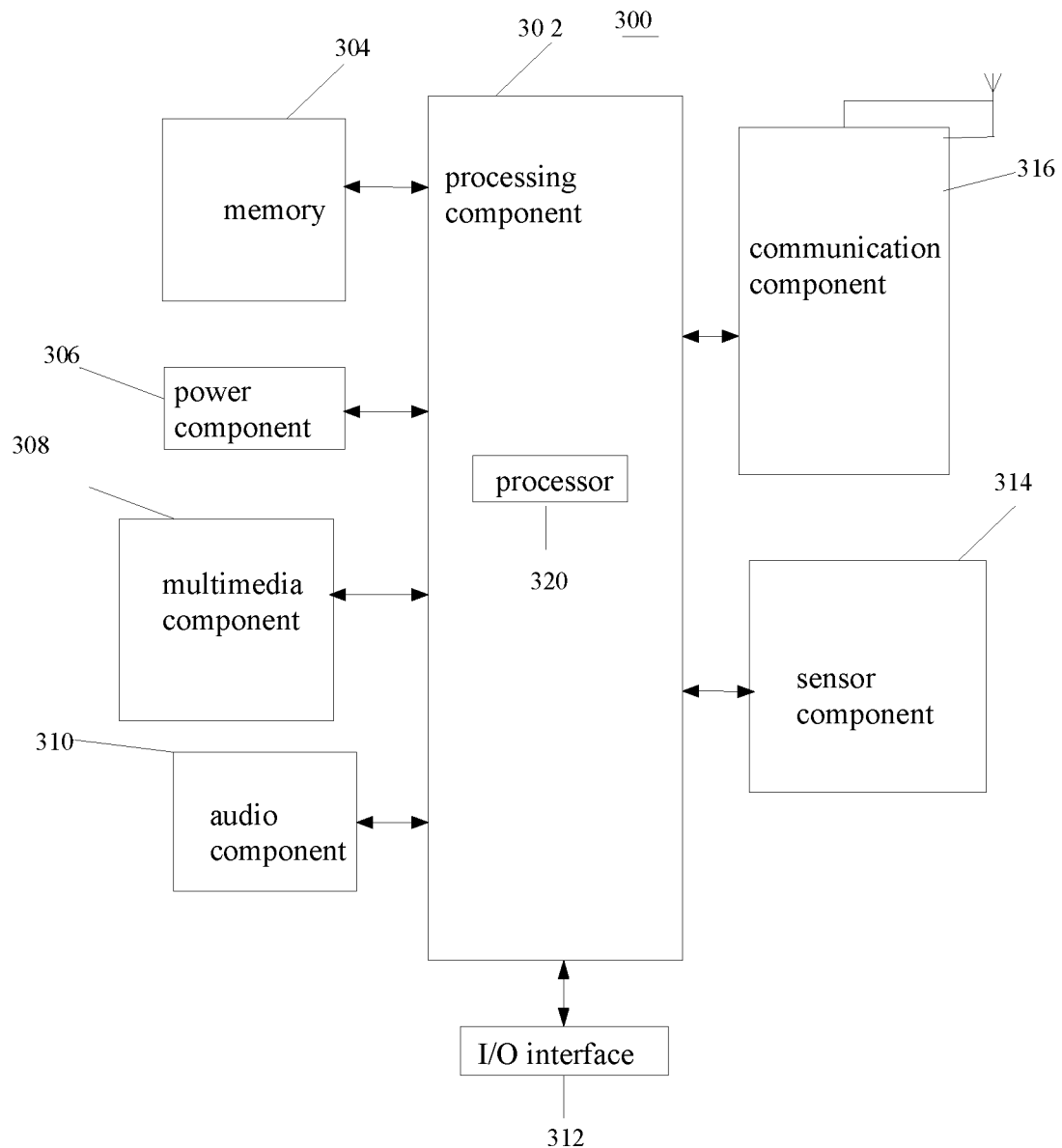
FIG. 8 is a block diagram of an apparatus for determining resource illustrated according to an embodiment.

FIG. 8 is a block diagram of an apparatus for determining resource according to an example embodiment. For example, the apparatus 300 may be a mobile phone, a computer, a digital broadcasting terminal, a messaging device, a game console, a tablet device, a medical equipment, a fitness equipment, a personal digital assistant, etc.

Referring to FIG. 8, the apparatus 300 may include one or more components: a processing component 302, a memory 304, a power component 306, a multimedia component 308, an audio component 310, an input/output (I/O) interface 312, a sensor component 314, and a communication component 316.

The processing component 302 generally controls the whole operation of the apparatus 300, such as the operations related to display, phone call, data communication, camera operation and recording operation. The processing component 302 may include one or more processors 320 to perform instructions, to complete all or part of blocks of the above method. In addition, the processing component 302 may include one or more modules for the convenience of interaction between the processing component 302 and other components. For example, the processing component 302 may include a multimedia module for the convenience of interaction between the multimedia component 308 and the processing component 302.

The memory 304 is configured to store all types of data to support the operation of the apparatus 300. Examples of the data include the instructions of any applications or methods operated on the apparatus 300, contact data, phone book data, messages, pictures, videos, etc. The memory 304 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power component 306 may provide power for all components of the apparatus 300. The power component 306 may include power supply management system, one or more power supplies, and other units related to generating, managing and distributing power for the apparatus 300.

The multimedia component 308 includes an output interface screen provided between the apparatus 300 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touch, slide and gestures on the touch panel. The touch sensor may not only sense the boundary of the touch or slide action, but also detect the duration and pressure related to the touch or slide operation. In some embodiments, the multimedia component 308 includes a front camera and/or a rear camera. When the apparatus 300 is in an operation mode, such as a shooting mode or a video mode, the front camera and/or the rear camera may receive external multimedia data. Each front camera and rear camera may be a fixed optical lens system or an optical lens system with a focal length and an optical zoom capacity.

The audio component 310 is configured to output and/or input a signal. For example, the audio component 310 includes a microphone (MIC). When the apparatus 300 is in operation mode, such as call mode, record mode, and speech recognition mode, the microphone is configured to receive the external audio signals. The audio signal received may be further stored in the memory 304 or sent via the communication component 316. In some embodiments, the audio component 310 further includes a speaker configured to output an audio signal.

The I/O interface 312 provides an interface for the processing component 302 and the peripheral interface module, and the peripheral interface module may be a keyboard, a click wheel, a button, etc. The button may include but not limited to a home button, a volume button, a start button and a lock button.

The sensor component 314 includes one or more sensors, configured to provide various aspects of status assessment for the apparatus 300. For example, the sensor component 314 may detect the on/off state of the apparatus 300 and the relative positioning of the component. For example, the component is a display and a keypad of the apparatus 300. The sensor component 314 may further detect the position change of the apparatus 300 or one component of the apparatus 300, the presence or absence of contact between the user and the apparatus 300, the orientation or acceleration/deceleration of the apparatus 300, and the temperature change of the apparatus 300. The sensor component 314 may include a proximity sensor configured to detect the existence of the objects nearby without any physical contact. The sensor component 314 may further include a light sensor such as CMOS or CCD image sensor, which is configured to use in imaging applications. In some embodiments, the sensor component 314 may further include an acceleration transducer, a gyroscope sensor, a magnetic sensor, a pressure sensor or a temperature sensor.

The communication component 316 is configured for the convenience of wire or wireless communication between the apparatus 300 and other devices. The apparatus 300 may access wireless networks based on a communication standard, such as WiFi, 2G or 3G, 4G LTE, 5G NR or their combination. In an example embodiment, the communication component 316 receives a broadcast signal or broadcast-related information from an external broadcast management system via a broadcast channel. In an embodiment, the communication component 316 further includes a near field communication (NFC) module to facilitate short-range communication. For example, the NFC module may be achieved based on an RFID technology, an IrDA technology, a UWB technology, a BT technology and other technologies.

In an example embodiment, the apparatus 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, to perform the method as described in the above any embodiment.

In an example embodiment, a non-transitory computer readable storage medium including instructions is further provided, such as a memory 304 including instructions, the instructions may be executed by the processor 320 of the apparatus 300 to complete the above method. For example, the non-transitory computer readable storage medium may be a ROM, a random access memory (RAM), a CD-ROM, a magnetic tape, a floppy disk, an optical data storage device, etc.

Figure 9:
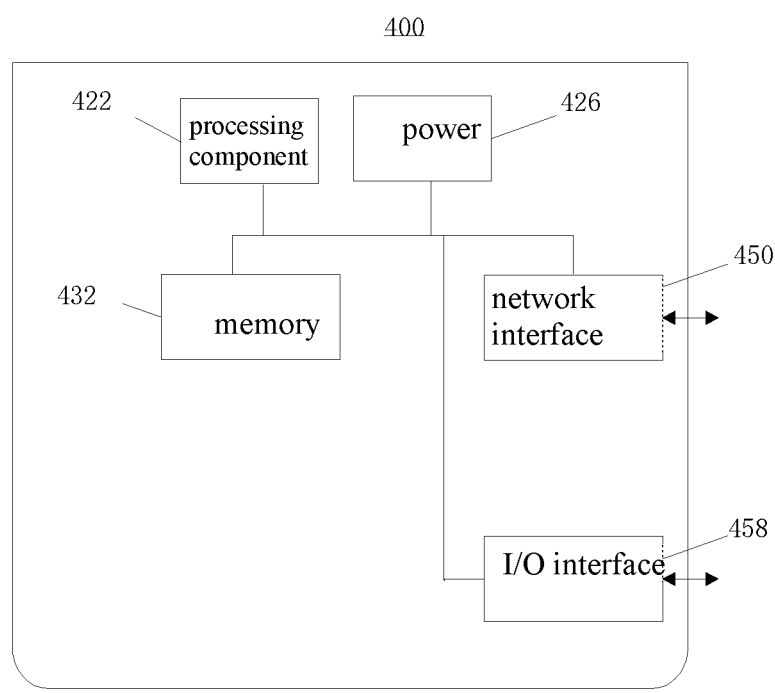
FIG. 9 is a block diagram of an apparatus for determining resource illustrated according to an embodiment.

FIG. 9 is a block diagram of an apparatus 400 for determining resource according to an embodiment. For example, the apparatus may be the first device or the second device involved in the embodiments of the present disclosure, such as be provided as a server. Referring to FIG. 7, the apparatus 400 includes a processing component 422, further including one or more processors, and a memory resource represented by a memory 432, configured to store instructions executable by the processing component 422, for example, an application program. The application program stored in the memory 432 may include one or more than one module of which each corresponds to a set of instructions. In addition, the processing component 422 is configured to execute the instructions to execute the instructions to execute the above method.

The apparatus 400 may further include a power component 426 configured to execute power management of the apparatus 400, a wired or wireless network interface 450 configured to connect the apparatus 400 to a network and an I/O interface 458. The apparatus 400 may be operated based on an operating system stored in the memory 432, for example, Windows Server™, Max OS X™, Unix™, Linux™, FreeBSD™ or the like.

In an embodiment, there is also provided a non-transitory computer-readable storage medium including instructions, such as included in the memory 432, executable by the processing component 422 of the apparatus 400 for performing the abovementioned methods. For example, the non-transitory computer-readable storage medium may be a ROM, a RAM, a CD-ROM, a magnetic tape, a floppy disc, an optical data storage device, and the like.

According to a first aspect of embodiments of the present disclosure, a method for determining resource is provided, applied to a first device, and includes:

sending first indication information, wherein the first indication information includes an indication of a time-frequency resource set; sending second indication information, wherein the second indication information includes an indication of a measurement information value corresponding to the time-frequency resource set.

In an embodiment, the measurement information value includes a reference signal received power value or a reference signal received power offset value.

In an embodiment, the measurement information value belongs to a specified measurement information value set.

In an embodiment, the method for determining resource further includes:

receiving downlink control information sent by a network device, and acquiring the specified measurement information value set through an indication in the downlink control information; or acquiring the specified measurement information value set according to pre-configuration information.

In an embodiment, the measurement information value set is configured based on a sidelink resource pool or a sidelink communication bandwidth part.

In an embodiment, the measurement information value is determined based on a reference signal information measurement value; the reference signal information measurement value is obtained based on a measurement of reference signal information for a monitored sidelink control signaling or a sidelink transmission corresponding to the monitored sidelink control signaling, and the sidelink control signaling indicates a reserved resource overlapping with the time-frequency resource set.

In an embodiment, the measurement information value is determined based on a specified measurement threshold value.

In an embodiment, the method for determining resource further includes:

receiving downlink control information sent by a network device, and acquiring the specified measurement threshold value through an indication in the downlink control information; or acquiring the specified measurement threshold value according to pre-configuration information.

In an embodiment, the first indication information and/or the second indication information is included in a sent sidelink control signaling.

In an embodiment, the sidelink control signaling includes a first part of the sidelink control signaling and a second part of the sidelink control signaling; the first part of the sidelink control signaling includes the first indication information and/or the second indication information, and/or the second part of the sidelink control signaling includes the first indication information and/or the second indication information.

In an embodiment, the first indication information and the second indication information are included in the sidelink control signaling sent in a same time unit.

In an embodiment, the second indication information includes priority information corresponding to the time-frequency resource set.

According to a second aspect of embodiments of the present disclosure, a method for determining resource is provided, applied to a second device, and includes:

receiving first indication information and second indication information sent by a first device, wherein the first indication information includes an indication of a time-frequency resource set, and the second indication information includes an indication of a measurement information value corresponding to the time-frequency resource set; performing resource selection based on the first indication information and the second indication information.

In an embodiment, the performing the resource selection based on the first indication information and the second indication information, includes:

excluding a resource set indicated by the first indication information from a candidate resource set based on a measurement information value indicated by the second indication information.

In an embodiment, the method for determining resource further includes receiving priority information sent by the first device.

The excluding the resource set indicated by the first indication information from the candidate resource set based on the measurement information value indicated by the second indication information, includes:

determining a first threshold value of the measurement information value according to the priority information and a priority of data to be sent; determining an information measurement estimate value according to the measurement information value indicated by the second indication information; excluding, in response to that the information measurement estimate value is greater than the first threshold value of the measurement information value, the resource set indicated by the first indication information from the candidate resource set.

In an embodiment, the method for determining resource further includes: receiving downlink control information sent by a network device, and determining the first threshold value of the measurement information value according to an indication in the downlink control information.

In an embodiment, the method for determining resource further includes:

obtaining a reference signal information measurement value by performing a measurement of reference signal information for a monitored sidelink control signaling or a sidelink transmission corresponding to the monitored sidelink control signaling; determining a second threshold value of a measurement information value according to priority information indicated by the monitored sidelink control signaling and a priority of data to be sent.

The performing the resource selection based on the first indication information and the second indication information includes:

in response to that a difference between the reference signal information measurement value and the second threshold value of the measurement information value is greater than a measurement information value indicated by the second indication information.

A reserved resource indicated in the sidelink control signaling is excluded from a candidate resource; or in response to that the reference signal information measurement value is greater than the second threshold value of the measurement information value, a reserved resource indicated in the sidelink control signaling is excluded from a candidate resource set.

In an embodiment, in response to that the difference between the reference signal information measurement value and the second threshold value of the measurement information value is greater than the measurement information value indicated by the second indication information, and the reserved resource indicated in the sidelink control signaling overlaps with a resource in the time-frequency resource set, excluding the reserved resource indicated in the sidelink control signaling from the candidate resource.

In an embodiment, the measurement information value includes a reference signal received power value or a reference signal received power offset value.

In an embodiment, the measurement information value belongs to a specified measurement information value set.

In an embodiment, the method for determining resource further includes:

receiving downlink control information sent by a network device, and acquiring the specified measurement information value set through an indication in the downlink control information; or acquiring the specified measurement information value set according to pre-configuration information.

In an embodiment, a measurement information value set is configured based on a sidelink resource pool or a sidelink communication bandwidth part.

In an embodiment, the first indication information and/or the second indication information is included in a received sidelink control signaling.

In an embodiment, the first indication information and/or the second indication information is included in a sidelink control signaling received in a same time unit.

In an embodiment, the sidelink control signaling includes a first part of the sidelink control signaling and a second part of the sidelink control signaling; the first part of the sidelink control signaling includes the first indication information and/or the second indication information, and/or the second part of the sidelink control signaling includes the first indication information and/or the second indication information.

In an embodiment, the second indication information includes priority information corresponding to the time-frequency resource set.

According to a third aspect of embodiments of the present disclosure, an apparatus for determining resource is provided, applied to a first device, and includes:

a sending unit, configured to send first indication information, wherein the first indication information includes an indication of a time-frequency resource set, and configured to send second indication information, wherein the second indication information includes an indication of a measurement information value corresponding to the time-frequency resource set.

In an embodiment, the measurement information value includes a reference signal received power value or a reference signal received power offset value.

In an embodiment, the measurement information value belongs to a specified measurement information value set.

In an embodiment, the apparatus for determining resource further includes a receiving unit, and the receiving unit is configured to:

receive downlink control information sent by a network device, and acquire the specified measurement information value set through an indication in the downlink control information; or acquire the specified measurement information value set according to pre-configuration information.

In an embodiment, the measurement information value set is configured based on a sidelink resource pool or a sidelink communication bandwidth part.

In an embodiment, the measurement information value is determined based on a reference signal information measurement value. The reference signal information measurement value is obtained based on a measurement of reference signal information for a monitored sidelink control signaling or a sidelink transmission corresponding to the monitored sidelink control signaling, and the sidelink control signaling indicates a reserved resource overlapping with the time-frequency resource set.

In an embodiment, the measurement information value is determined based on a specified measurement threshold value.

In an embodiment, the apparatus for determining resource further includes a receiving unit, and the receiving unit is configured to:

receive downlink control information sent by a network device, and acquire the specified measurement threshold value through an indication in the downlink control information; or acquire the specified measurement threshold value according to pre-configuration information.

In an embodiment, the first indication information and/or the second indication information is included in a sent sidelink control signaling.

In an embodiment, the sidelink control signaling includes a first part of the sidelink control signaling and a second part of the sidelink control signaling; the first part of the sidelink control signaling includes the first indication information and/or the second indication information, and/or the second part of the sidelink control signaling includes the first indication information and/or the second indication information.

In an embodiment, the first indication information and the second indication information are included in the sidelink control signaling sent in a same time unit.

In an embodiment, the second indication information includes priority information corresponding to the time-frequency resource set.

According to a fourth aspect of embodiments of the present disclosure, an apparatus for determining resource is provided, applied to a second device, and includes:

a receiving unit, configured to receive first indication information and second indication information sent by a first device, wherein the first indication information includes an indication of a time-frequency resource set, and the second indication information includes an indication of a measurement information value corresponding to the time-frequency resource set; a processing unit, configured to perform resource selection based on the first indication information and the second indication information.

In an embodiment, the processing unit is configured to perform the resource selection based on the first indication information and the second indication information in the following manner:

excluding a resource set indicated by the first indication information from a candidate resource set based on a measurement information value indicated by the second indication information.

In an embodiment, the receiving unit is further configured to receive priority information sent by the first device;

the processing unit is configured to exclude the resource set indicated by the first indication information from the candidate resource set based on the measurement information value indicated by the second indication information in the following manner:

determining a first threshold value of the measurement information value according to the priority information and a priority of data to be sent; determining an information measurement estimate value according to the measurement information value indicated by the second indication information; excluding, in response to that the information measurement estimate value is greater than the first threshold value of the measurement information value, the resource set indicated by the first indication information from the candidate resource set.

In an embodiment, the receiving unit is further configured to receive downlink control information sent by a network device, and determine the first threshold value of the measurement information value according to an indication in the downlink control information.

In an embodiment, the processing unit is further configured to:

obtain a reference signal information measurement value by performing a measurement of reference signal information for a monitored sidelink control signaling or a sidelink transmission corresponding to the monitored sidelink control signaling, and determine a second threshold value of a measurement information value according to priority information indicated by the monitored sidelink control signaling and a priority of data to be sent.

The processing unit is configured to perform the resource selection based on the first indication information and the second indication information in the following manner:

excluding, in response to that a difference between the reference signal information measurement value and the second threshold value of the measurement information value is greater than a measurement information value indicated by the second indication information, a reserved resource indicated in the sidelink control signaling from a candidate resource set; or excluding, in response to that the reference signal information measurement value is greater than the second threshold value of the measurement information value, a reserved resource indicated in the sidelink control signaling from a candidate resource set.

In an embodiment, the processing unit is further configured to, exclude, in response to that the difference between the reference signal information measurement value and the second threshold value of the measurement information value is greater than the measurement information value indicated by the second indication information, and the reserved resource indicated in the sidelink control signaling overlaps with a resource in the time-frequency resource set, the reserved resource indicated in the sidelink control signaling from the candidate resource set.

In an embodiment, the measurement information value belongs to a specified measurement information value set.

In an embodiment, the receiving unit is further configured to: receive downlink control information sent by a network device, and acquire the specified measurement information value set through an indication in the downlink control information; or acquire the specified measurement information value set according to pre-configuration information.

In an embodiment, the measurement information value set is configured based on a sidelink resource pool or a sidelink communication bandwidth part.

In an embodiment, the first indication information and/or the second indication information is included in a received sidelink control signaling.

In an embodiment, the first indication information and the second indication information are included in the sidelink control signaling received in a same time unit.

In an embodiment, the sidelink control signaling includes a first part of the sidelink control signaling and a second part of the sidelink control signaling; the first part of the sidelink control signaling includes the first indication information and/or the second indication information, and/or the second part of the sidelink control signaling comprises the first indication information and/or the second indication information.

In an embodiment, the second indication information includes priority information corresponding to the time-frequency resource set.

According to a fifth aspect of embodiments of the present disclosure, an apparatus for determining resource is provided and includes:

a processor; a memory for storing executable instructions in the processor;

the processor is configured to execute the method for determining resource described in the first aspect or any embodiment of the first aspect.

According to a sixth aspect of embodiments of the present disclosure, an apparatus for determining resource is provided and includes:

a processor; a memory for storing executable instructions in the processor;

the processor is configured to execute the method for determining resource described in the second aspect or any embodiment of the second aspect.

According to a seventh aspect of embodiments of the present disclosure, a non-transitory computer-readable storage medium is provided, when instructions in the storage medium is executed by a processor of a first device, cause the first device to execute the method for determining resource described in the first aspect or any embodiment of the first aspect.

According to an eighth aspect of embodiments of the present disclosure, a non-transitory computer-readable storage medium is provided, when instructions in the storage medium is executed by a processor of a second device, cause the second device to execute the method for determining resource described in the second aspect or any embodiment of the second aspect.

The technical solution provided by the embodiments of the present disclosure may include the following beneficial effects: the first device sends the first indication information containing the indication of the time-frequency source set, and the second indication information containing the indication of the measurement information value corresponding to the time-frequency resource set, so that the second device receiving the first indication information and the second indication information may perform resource selection based on the first indication information and the second indication information, thereby achieving that the second device uses the time-frequency resource set indicated by the first device to perform the resource selection of the second user device and achieving resource coordination between different devices.

It may be understood that in the disclosure, "plurality" refers to two or more than two, and other quantifiers are similar. The term "and/or" describes an association relationship between the associated objects, indicating that there may be three types of relationships, for example, A and/or B, which can mean: A alone exists, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It may be further understood that the terms "first", "second", etc. are used to describe various information, but the information should not be limited to these terms. These terms are only used to distinguish the same type of information from each other, and do not indicate a specific order or degree of importance. In fact, expressions such as "first" and "second" may be used interchangeably. For example, without departing from the scope of the disclosure, the first information may also be referred to as second information, and similarly, the second information may also be referred to as first information.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

It may be understood that, although the operations are described in a specific order in the drawings in the embodiments of the disclosure, it should not be understood that the operations are required to be performed in the shown specific order or in a serial order, or all the shown operations are required to be performed to get a desired result. In specific circumstances, multitasking and parallel processing may be advantageous.

Those skilled in the art will be aware of other embodiments of the disclosure after considering the specification and practicing the disclosure disclosed herein. The disclosure is intended to cover any variations, uses, or adaptive changes of the disclosure, which follow the general principles of the disclosure and include common knowledge or conventional technical means in the technical field not disclosed herein. The description and the embodiments are to be regarded as exemplary only, and the true scope and spirit of the disclosure are indicated in the following claims.

It may be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for determining resource, comprising:
    sending, by a first device, first indication information, wherein the first indication information comprises an indication of a time-frequency resource set; and
    sending, by the first device, second indication information, wherein the second indication information comprises an indication of a measurement information value corresponding to the time-frequency resource set,
    wherein the measurement information value is determined based on a reference signal information measurement value; and
    wherein the reference signal information measurement value is obtained based on a measurement of reference signal information for a monitored sidelink control signaling or a sidelink transmission corresponding to the monitored sidelink control signaling, and the sidelink control signaling indicates a reserved resource overlapping with the time-frequency resource set.

2. The method for determining resource according to claim 1, wherein the measurement information value comprises a reference signal received power value or a reference signal received power offset value.

3. The method for determining resource according to claim 1, wherein the measurement information value belongs to a specified measurement information value set.

4. The method for determining resource according to claim 3, further comprising:
    receiving downlink control information sent by a network device, and acquiring the specified measurement information value set through an indication in the downlink control information; or
    acquiring the specified measurement information value set according to pre-configuration information.

5. The method for determining resource according to claim 4, wherein the measurement information value set is configured based on a sidelink resource pool or a sidelink communication bandwidth part.

6. The method for determining resource according to claim 1, wherein the measurement information value is determined based on a specified measurement threshold value.

7. The method for determining resource according to claim 6, further comprising:
receiving downlink control information sent by a network device, and acquiring the specified measurement threshold value through an indication in the downlink control information; or
acquiring the specified measurement threshold value according to pre-configuration information.

8. The method for determining resource according to claim 1, wherein
at least one of the first indication information or the second indication information is comprised in a sent sidelink control signaling.

9. The method for determining resource according to claim 8, wherein the sidelink control signaling comprises a first part of the sidelink control signaling and a second part of the sidelink control signaling;
at least one of the first part of the sidelink control signaling or the second part of the sidelink control signaling comprises at least one of the first indication information or the second indication information.

10. The method for determining resource according to claim 8, wherein the first indication information and the second indication information are comprised in the sidelink control signaling sent in a same time unit.

11. The method for determining resource according to claim 1, wherein the second indication information comprises priority information corresponding to the time-frequency resource set.

12. A method for determining resource, comprising:
receiving, by a second device, first indication information and second indication information sent by a first device, wherein the first indication information comprises an indication of a time- frequency resource set, and the second indication information comprises an indication of a measurement information value corresponding to the time-frequency resource set; and
performing, by the second device, resource selection based on the first indication information and the second indication information; and
obtaining a reference signal information measurement value by performing a measurement of reference signal information for a monitored sidelink control signaling or a sidelink transmission corresponding to the monitored sidelink control signaling; wherein the measurement information value is determined based on the reference signal information measurement value.

13. The method for determining resource according to claim 12, wherein performing the resource selection based on the first indication information and the second indication information comprises:
excluding a resource set indicated by the first indication information from a candidate resource set based on the measurement information value indicated by the second indication information.

14. The method for determining resource according to claim 13, further comprising:
receiving priority information sent by the first device; and
wherein excluding the resource set indicated by the first indication information from the candidate resource set based on the measurement information value indicated by the second indication information comprises:
determining a first threshold value of the measurement information value according to the priority information and a priority of data to be sent;
determining an information measurement estimate value according to the measurement information value indicated by the second indication information; and
excluding, in response to that the information measurement estimate value is greater than the first threshold value, the resource set indicated by the first indication information from the candidate resource set.

15. The method for determining resource according to claim 14, further comprising:
receiving downlink control information sent by a network device, and determining the first threshold value according to an indication in the downlink control information.

16. The method for determining resource according to claim 12, further comprising:
determining a second threshold value of the measurement information value according to priority information indicated by the monitored sidelink control signaling and a priority of data to be sent; and
wherein performing the resource selection based on the first indication information and the second indication information comprises:
excluding, in response to that a difference between the reference signal information measurement value and the second threshold value is greater than the measurement information value indicated by the second indication information, a reserved resource indicated in the sidelink control signaling from a candidate resource set; or
excluding, in response to that the reference signal information measurement value is greater than the second threshold value, a reserved resource indicated in the sidelink control signaling from a candidate resource set.

17. The method for determining resource according to claim 16, wherein excluding the reserved resource indicated in the sidelink control signaling from the candidate resource comprising:
in response to that the difference between the reference signal information measurement value and the second threshold value is greater than the measurement information value indicated by the second indication information, and the reserved resource indicated in the sidelink control signaling overlaps with a resource in the time-frequency resource set, excluding the reserved resource indicated in the sidelink control signaling from the candidate resource set.

18. The method for determining resource according to claim 12, wherein the measurement information value comprises a reference signal received power value or a reference signal received power offset value.

19. The method for determining resource according to claim 18, the measurement information value belongs to a specified measurement information value set.

20. The method for determining resource according to claim 19, further comprising:
receiving downlink control information sent by a network device, and acquiring the specified measurement information value set through an indication in the downlink control information; or
acquiring the specified measurement information value set according to pre-configuration information.

21. The method for determining resource according to claim 20, wherein a measurement information value set is configured based on a sidelink resource pool or a sidelink communication bandwidth part.

22. The method for determining resource according to claim 12, wherein at least one of the first indication information or the second indication information is comprised in a received sidelink control signaling.

23. The method for determining resource according to claim 22, wherein the sidelink control signaling comprises a first part of the sidelink control signaling and a second part of the sidelink control signaling;
   at least one of the first part of the sidelink control signaling or the second part of the sidelink control signaling comprises at least one of the first indication information or the second indication information.

24. The method for determining resource according to claim 22, wherein the first indication information and the second indication information are comprised in the sidelink control signaling received in a same time unit.

25. The method for determining resource according to claim 12, wherein the second indication information comprises priority information corresponding to the time-frequency resource set.

26. An apparatus for determining resource, comprising:
a processor;
a memory for storing executable instructions in the processor;
wherein the processor is configured to execute a method for determining resource, the method is applied to a first device and comprises:
sending first indication information, wherein the first indication information comprises an indication of a time-frequency resource set;
sending second indication information, wherein the second indication information comprises an indication of a measurement information value corresponding to the time-frequency resource set,
wherein the measurement information value is determined based on a reference signal information measurement value; and
wherein the reference signal information measurement value is obtained based on a measurement of reference signal information for a monitored sidelink control signaling or a sidelink transmission corresponding to the monitored sidelink control signaling, and the sidelink control signaling indicates a reserved resource overlapping with the time-frequency resource set.

27. An apparatus for determining resource, comprising:
a processor;
a memory for storing executable instructions in the processor;
wherein the processor is configured to execute the method for determining resource according to claim 12.

* * * * *